United States Patent [19]
Cooperstein

[11] Patent Number: 5,893,071
[45] Date of Patent: Apr. 6, 1999

[54] ANNUITY VALUE SOFTWARE

[76] Inventor: Steve Paul Cooperstein, 310 Locust St., Pacific Grove, Calif. 93950

[21] Appl. No.: 738,950

[22] Filed: Oct. 24, 1996

[51] Int. Cl.$^6$ ..................................................... G06F 17/00
[52] U.S. Cl. .......................................... 705/4; 395/200.33
[58] Field of Search .................................. 705/4, 30, 34, 705/35, 36; 395/200.33, 200.47, 200.49, 200.77

[56] References Cited

U.S. PATENT DOCUMENTS

| | | | |
|---|---|---|---|
| 5,754,980 | 5/1998 | Anderson et al. | 704/14 |
| 5,761,441 | 6/1998 | Bennett | 395/235 |

*Primary Examiner*—Thomas Peeso
*Attorney, Agent, or Firm*—Merchant, Gould, Smith, Edell, Welter & Schmidt, P.A.

[57] ABSTRACT

A computer-implemented system for determining deferred and immediate annuity contract living contingent and supporting component funding and related data representing tangible annuity contract values across the life period of a potential or existing annuity contract. The system is comprised of at least a terminal, data storage and a programmed processor. The system provides for the physical transformation of annuity contract purchase value data representing tangible purchase values into annuity contract living contingent and supporting component funding and related data representing tangible deferred and immediate annuity contract values at one or more selected dates during the life period. The system also determines the eligibility for withdrawal of withdrawal values and transacts the payment of such withdrawal values. The system demonstrates and explains the underlying mechanisms of life annuities to the public and insurance sales and service people by increasing the level of financial disclosure in connection with how life annuity contracts work. The disclosure includes certain periodic, mainly yearly, financial living contingent and supporting component funding values inherent in how these contracts operate both in general and in the individual case.

24 Claims, 13 Drawing Sheets

FIG. 8

Annual Share Projection

Sex: M
Age: 65
Premium: $100,000
Mode: Monthly
Return of Unpaid Principal

Basis 23  Guaranteed

| Year | Deposit | Bank Account Withdrawal | Interest | Balance | Deposit | Survivorship Account Benefit | Interest | Lv. Cred. | Death Cost | Balance | Withdrawal Available Amt. | Death Benefit |
|---|---|---|---|---|---|---|---|---|---|---|---|---|
| 1 | $100,000 | $7,813 | $5,160 | $97,347 | $100,000 | $7,104 | $5,178 | $1,176 | $1,143 | $99,107 | $92,500 | $100,000 |
| 2 |  | $7,682 | $4,893 | $94,358 |  | $7,104 | $4,746 | $1,259 | $1,156 | $95,851 | $85,929 | $92,896 |
| 3 |  | $7,649 | $4,544 | $91,253 |  | $7,116 | $4,635 | $1,348 | $1,169 | $93,548 | $79,358 | $85,792 |
| 4 |  | $7,606 | $4,390 | $88,037 |  | $7,116 | $4,522 | $1,448 | $1,177 | $91,226 | $72,775 | $78,676 |
| 5 |  | $7,561 | $4,230 | $84,706 |  | $7,128 | $4,408 | $1,562 | $1,178 | $88,902 | $66,193 | $71,590 |
| 6 |  | $7,523 | $4,064 | $81,246 |  | $7,128 | $4,294 | $1,679 | $1,164 | $86,543 | $59,611 | $64,444 |
| 7 |  | $7,475 | $3,893 | $77,665 |  | $7,128 | $4,182 | $1,804 | $1,135 | $84,308 | $53,017 | $57,316 |
| 8 |  | $7,227 | $2,975 | $73,413 |  | $7,140 | $3,267 | $1,927 | $1,087 | $81,283 | $46,424 | $50,158 |
| 9 |  | $7,199 | $2,806 | $69,030 |  | $7,152 | $3,139 | $2,030 | $1,007 | $78,273 | $39,819 | $43,048 |
| 10 |  | $7,148 | $2,631 | $64,513 |  | $7,164 | $3,023 | $2,135 | $903 | $75,385 | $33,204 | $35,898 |
| 11 |  | $7,106 | $2,451 | $59,858 |  | $7,176 | $2,910 | $2,246 | $802 | $72,677 | $26,577 | $28,732 |
| 12 |  | $7,071 | $2,266 | $55,053 |  | $7,200 | $2,804 | $2,362 | $802 | $69,941 | $19,939 | $21,556 |
| 13 |  | $7,036 | $2,074 | $50,091 |  | $7,224 | $2,704 | $2,468 | $396 | $67,510 | $13,279 | $14,356 |
| 14 |  | $7,005 | $1,876 | $44,962 |  | $7,260 | $2,613 | $2,626 | $150 | $65,339 | $6,597 | $7,132 |
| 15 |  | $6,974 | $1,672 | $39,680 |  | $7,296 | $2,531 | $2,769 | $0 | $63,343 | $0 | $0 |
| 16 |  | $6,941 | $1,460 | $34,179 |  | $7,332 | $2,463 | $2,897 | $0 | $61,361 | $0 | $0 |
| 17 |  | $6,915 | $1,241 | $28,505 |  | $7,380 | $2,376 | $3,029 | $0 | $59,345 | $0 | $0 |
| 18 |  | $6,877 | $1,015 | $22,643 |  | $7,416 | $2,298 | $3,164 | $0 | $57,432 | $0 | $0 |
| 19 |  | $6,838 | $781 | $16,586 |  | $7,452 | $2,222 | $3,302 | $0 | $55,504 | $0 | $0 |
| 20 |  | $6,798 | $540 | $10,330 |  | $7,488 | $2,147 | $3,439 | $0 | $53,602 | $0 | $0 |
| 21 |  | $6,752 | $290 | $3,868 |  | $7,524 | $2,073 | $3,572 | $0 | $51,722 | $0 | $0 |
| 22 |  | $3,919 | $51 | $0 |  | $7,560 | $1,999 | $3,696 | $0 | $49,857 | $0 | $0 |
| 23 |  | $0 | $0 | $0 |  | $7,608 | $1,928 | $3,807 | $0 | $47,981 | $0 | $0 |
| 24 |  | $0 | $0 | $0 |  | $7,644 | $1,863 | $3,978 | $0 | $46,198 | $0 | $0 |
| 25 |  | $0 | $0 | $0 |  | $7,680 | $1,783 | $4,147 | $0 | $44,418 | $0 | $0 |
| 26 |  | $0 | $0 | $0 |  | $7,728 | $1,296 | $4,299 | $0 | $42,273 | $0 | $0 |
| 27 |  | $0 | $0 | $0 |  | $7,764 | $1,223 | $4,430 | $0 | $40,162 | $0 | $0 |
| 28 |  | $0 | $0 | $0 |  | $7,800 | $1,161 | $4,560 | $0 | $38,083 | $0 | $0 |
| 29 |  | $0 | $0 | $0 |  | $7,848 | $1,099 | $4,564 | $0 | $35,918 | $0 | $0 |
| 30 |  | $0 | $0 | $0 |  | $7,896 | $1,033 | $4,679 | $0 | $33,634 | $0 | $0 |
| 31 |  | $0 | $0 | $0 |  | $7,932 | $983 | $4,538 | $0 | $31,204 | $0 | $0 |
| 32 |  | $0 | $0 | $0 |  | $7,980 | $969 | $4,447 | $0 | $28,560 | $0 | $0 |
| 33 |  | $0 | $0 | $0 |  | $8,016 | $913 | $4,760 | $0 | $26,117 | $0 | $0 |
| 34 |  | $0 | $0 | $0 |  | $8,064 | $745 | $5,140 | $0 | $23,938 | $0 | $0 |
| 35 |  | $0 | $0 | $0 |  | $8,100 | $686 | $5,637 | $0 | $22,160 | $0 | $0 |
| 36 |  | $0 | $0 | $0 |  | $8,160 | $641 | $6,353 | $0 | $20,994 | $0 | $0 |
| 37 |  | $0 | $0 | $0 |  | $8,160 | $619 | $7,347 | $0 | $20,801 | $0 | $0 |
| 38 |  | $0 | $0 | $0 |  | $8,160 | $618 | $7,550 | $0 | $20,806 | $0 | $0 |
| 39 |  | $0 | $0 | $0 |  | $8,160 | $616 | $7,552 | $0 | $20,814 | $0 | $0 |
| 40 |  | $0 | $0 | $0 |  | $8,160 | $616 | $7,556 | $0 | $20,826 | $0 | $0 |

FIG. 9

AnnuitShare Projection

Sex: M
Age: 65
Premium: $100,000
Mode: Monthly
Return of Unpaid Principal  Basis 23  Current

| Year | Deposit | Bank Account Withdrawal | Interest | Balance | Deposit | Survivorship Account Benefit | Interest | Liv. Cred. | Death Cost | Balance | Withdrawal Available Amt | Death Benefit |
|---|---|---|---|---|---|---|---|---|---|---|---|---|
| 1 | $100,000 | $7,813 | $5,160 | $97,347 | $100,000 | $7,104 | $5,178 | $1,176 | $1,143 | $98,107 | $92,500 | $100,000 |
| 2 |  | $7,799 | $5,019 | $94,567 |  | $7,140 | $5,078 | $1,261 | $1,157 | $96,148 | $85,929 | $92,696 |
| 3 |  | $7,775 | $4,870 | $91,662 |  | $7,164 | $4,974 | $1,355 | $1,168 | $94,145 | $79,324 | $85,755 |
| 4 |  | $7,757 | $4,716 | $88,621 |  | $7,200 | $4,868 | $1,461 | $1,175 | $92,100 | $72,694 | $78,592 |
| 5 |  | $7,730 | $4,553 | $85,444 |  | $7,224 | $4,761 | $1,579 | $1,174 | $90,042 | $66,038 | $71,392 |
| 6 |  | $7,708 | $4,384 | $82,120 |  | $7,260 | $4,654 | $1,703 | $1,158 | $87,961 | $59,355 | $64,168 |
| 7 |  | $7,684 | $4,207 | $78,643 |  | $7,296 | $4,547 | $1,838 | $1,125 | $85,942 | $52,640 | $56,908 |
| 8 |  | $7,710 | $4,020 | $74,953 |  | $7,404 | $4,440 | $1,978 | $1,071 | $83,685 | $45,891 | $49,612 |
| 9 |  | $7,732 | $3,822 | $71,043 |  | $7,512 | $4,332 | $2,110 | $982 | $81,633 | $39,042 | $42,208 |
| 10 |  | $7,752 | $3,613 | $66,904 |  | $7,620 | $4,226 | $2,249 | $864 | $79,625 | $32,094 | $34,996 |
| 11 |  | $7,775 | $3,391 | $62,520 |  | $7,740 | $4,123 | $2,396 | $711 | $77,893 | $25,045 | $27,076 |
| 12 |  | $7,795 | $3,155 | $57,879 |  | $7,860 | $4,025 | $2,554 | $519 | $76,092 | $17,896 | $19,336 |
| 13 |  | $7,822 | $2,907 | $52,963 |  | $7,992 | $3,935 | $2,726 | $262 | $74,460 | $10,615 | $11,476 |
| 14 |  | $7,843 | $2,643 | $47,764 |  | $8,124 | $3,857 | $2,918 | $35 | $73,095 | $3,223 | $3,484 |
| 15 |  | $7,868 | $2,364 | $42,260 |  | $8,268 | $3,786 | $3,118 | $0 | $71,732 | $0 | $0 |
| 16 |  | $7,888 | $2,068 | $36,440 |  | $8,412 | $3,714 | $3,302 | $0 | $70,335 | $0 | $0 |
| 17 |  | $7,906 | $1,757 | $30,291 |  | $8,556 | $3,640 | $3,495 | $0 | $68,914 | $0 | $0 |
| 18 |  | $7,926 | $1,428 | $23,794 |  | $8,712 | $3,565 | $3,696 | $0 | $67,464 | $0 | $0 |
| 19 |  | $7,932 | $1,080 | $16,942 |  | $8,856 | $3,489 | $3,904 | $0 | $66,001 | $0 | $0 |
| 20 |  | $7,942 | $713 | $9,713 |  | $9,012 | $3,413 | $4,116 | $0 | $64,518 | $0 | $0 |
| 21 |  | $7,945 | $327 | $2,095 |  | $9,168 | $3,335 | $4,327 | $0 | $63,012 | $0 | $0 |
| 22 |  | $2,114 | $19 | $0 |  | $9,324 | $3,255 | $4,531 | $0 | $61,474 | $0 | $0 |
| 23 |  | $0 | $0 | $0 |  | $9,492 | $3,174 | $4,724 | $0 | $59,880 | $0 | $0 |
| 24 |  | $0 | $0 | $0 |  | $9,660 | $3,091 | $4,993 | $0 | $58,304 | $0 | $0 |
| 25 |  | $0 | $0 | $0 |  | $9,828 | $3,009 | $5,270 | $0 | $56,755 | $0 | $0 |
| 26 |  | $0 | $0 | $0 |  | $10,080 | $2,927 | $5,554 | $0 | $55,157 | $0 | $0 |
| 27 |  | $0 | $0 | $0 |  | $10,344 | $2,842 | $5,844 | $0 | $53,499 | $0 | $0 |
| 28 |  | $0 | $0 | $0 |  | $10,520 | $2,754 | $6,141 | $0 | $51,774 | $0 | $0 |
| 29 |  | $0 | $0 | $0 |  | $10,896 | $2,659 | $6,300 | $0 | $49,836 | $0 | $0 |
| 30 |  | $0 | $0 | $0 |  | $11,172 | $2,552 | $6,423 | $0 | $47,641 | $0 | $0 |
| 31 |  | $0 | $0 | $0 |  | $11,472 | $2,429 | $6,498 | $0 | $45,064 | $0 | $0 |
| 32 |  | $0 | $0 | $0 |  | $11,760 | $2,287 | $6,495 | $0 | $42,117 | $0 | $0 |
| 33 |  | $0 | $0 | $0 |  | $12,060 | $2,135 | $7,093 | $0 | $39,264 | $0 | $0 |
| 34 |  | $0 | $0 | $0 |  | $12,372 | $1,993 | $7,811 | $0 | $36,716 | $0 | $0 |
| 35 |  | $0 | $0 | $0 |  | $12,684 | $1,871 | $8,732 | $0 | $34,635 | $0 | $0 |
| 36 |  | $0 | $0 | $0 |  | $12,996 | $1,762 | $10,030 | $0 | $33,451 | $0 | $0 |
| 37 |  | $0 | $0 | $0 |  | $13,248 | $1,755 | $11,825 | $0 | $33,783 | $0 | $0 |
| 38 |  | $0 | $0 | $0 |  | $13,512 | $1,779 | $12,384 | $0 | $34,434 | $0 | $0 |
| 39 |  | $0 | $0 | $0 |  | $13,764 | $1,814 | $12,624 | $0 | $35,108 | $0 | $0 |
| 40 |  | $0 | $0 | $0 |  | $14,040 | $1,849 | $12,870 | $0 | $35,787 | $0 | $0 |

AnnuiShare Projection

Sex: M
Age: 65
Premium: $100,000
Mode: Monthly
Return of Unpaid Principal

Basis 23    Current    Net withdrawal of: $25,000
End of year: 5

| Year | Deposit | Bank Account | | | | Deposit | Survivorship Account | | | | | Withdrawal Available Amt | Death Benefit |
|---|---|---|---|---|---|---|---|---|---|---|---|---|---|
| | | Withdrawal | Interest | Balance | | | Benefit | Interest | Lv. Cred. | Death Cost | Balance | | |
| 1 | $100,000 | $7,813 | $5,160 | $97,347 | | $100,000 | $7,104 | $5,176 | $1,176 | $1,143 | $96,107 | $92,500 | $100,000 |
| 2 | | $7,799 | $5,019 | $94,567 | | | $7,140 | $5,076 | $1,261 | $1,157 | $95,146 | $85,929 | $92,896 |
| 3 | | $7,775 | $4,870 | $91,662 | | | $7,164 | $4,974 | $1,355 | $1,168 | $94,145 | $79,324 | $85,756 |
| 4 | | $7,757 | $4,716 | $88,621 | | | $7,200 | $4,868 | $1,461 | $1,175 | $92,100 | $72,696 | $78,592 |
| 5 | | $27,240 | $4,736 | $66,117 | | | $34,251 | $4,761 | $1,579 | $1,174 | $63,015 | $66,036 | $71,392 |
| 6 | | $5,936 | $3,393 | $63,574 | | | $5,184 | $3,258 | $1,192 | $962 | $61,619 | $34,355 | $37,141 |
| 7 | | $5,915 | $3,258 | $60,916 | | | $5,208 | $3,166 | $1,287 | $821 | $60,263 | $29,560 | $31,957 |
| 8 | | $5,927 | $3,115 | $58,105 | | | $5,280 | $3,115 | $1,388 | $564 | $58,923 | $24,743 | $26,749 |
| 9 | | $5,945 | $2,964 | $55,124 | | | $5,364 | $3,046 | $1,494 | $482 | $57,607 | $19,859 | $21,469 |
| 10 | | $5,952 | $2,605 | $51,976 | | | $5,436 | $2,979 | $1,585 | $377 | $56,358 | $14,697 | $16,105 |
| 11 | | $5,966 | $2,636 | $48,646 | | | $5,520 | $2,916 | $1,694 | $246 | $55,202 | $9,669 | $10,669 |
| 12 | | $5,985 | $2,457 | $45,118 | | | $5,616 | $2,858 | $1,813 | $85 | $54,173 | $4,763 | $5,149 |
| 13 | | $6,001 | $2,268 | $41,385 | | | $5,712 | $2,807 | $1,945 | $0 | $53,212 | $0 | $0 |
| 14 | | $6,014 | $2,068 | $37,439 | | | $5,808 | $2,757 | $2,066 | $0 | $52,247 | $0 | $0 |
| 15 | | $6,024 | $1,857 | $33,272 | | | $5,904 | $2,706 | $2,229 | $0 | $51,278 | $0 | $0 |
| 16 | | $6,039 | $1,633 | $28,866 | | | $6,012 | $2,655 | $2,360 | $0 | $50,281 | $0 | $0 |
| 17 | | $6,051 | $1,397 | $24,213 | | | $6,120 | $2,602 | $2,498 | $0 | $49,261 | $0 | $0 |
| 18 | | $6,059 | $1,148 | $19,302 | | | $6,228 | $2,549 | $2,642 | $0 | $48,224 | $0 | $0 |
| 19 | | $6,063 | $885 | $14,124 | | | $6,336 | $2,494 | $2,791 | $0 | $47,173 | $0 | $0 |
| 20 | | $6,063 | $608 | $8,670 | | | $6,444 | $2,439 | $2,942 | $0 | $46,110 | $0 | $0 |
| 21 | | $6,060 | $317 | $2,926 | | | $6,552 | $2,383 | $3,092 | $0 | $45,033 | $0 | $0 |
| 22 | | $2,971 | $44 | ($0) | | | $6,660 | $2,327 | $3,238 | $0 | $43,938 | $0 | $0 |
| 23 | | $0 | $0 | ($0) | | | $6,780 | $2,268 | $3,377 | $0 | $42,803 | $0 | $0 |
| 24 | | $0 | $0 | ($0) | | | $6,900 | $2,210 | $3,570 | $0 | $41,662 | $0 | $0 |
| 25 | | $0 | $0 | ($0) | | | $7,020 | $2,151 | $3,768 | $0 | $40,581 | $0 | $0 |
| 26 | | $0 | $0 | ($0) | | | $7,200 | $2,093 | $3,972 | $0 | $39,446 | $0 | $0 |
| 27 | | $0 | $0 | ($0) | | | $7,392 | $2,033 | $4,180 | $0 | $38,267 | $0 | $0 |
| 28 | | $0 | $0 | ($0) | | | $7,596 | $1,970 | $4,392 | $0 | $37,033 | $0 | $0 |
| 29 | | $0 | $0 | ($0) | | | $7,788 | $1,902 | $4,507 | $0 | $35,654 | $0 | $0 |
| 30 | | $0 | $0 | ($0) | | | $7,992 | $1,826 | $4,595 | $0 | $34,064 | $0 | $0 |
| 31 | | $0 | $0 | ($0) | | | $8,208 | $1,738 | $4,647 | $0 | $32,261 | $0 | $0 |
| 32 | | $0 | $0 | ($0) | | | $8,412 | $1,636 | $4,647 | $0 | $30,132 | $0 | $0 |
| 33 | | $0 | $0 | ($0) | | | $8,628 | $1,527 | $5,075 | $0 | $28,106 | $0 | $0 |
| 34 | | $0 | $0 | ($0) | | | $8,844 | $1,426 | $5,589 | $0 | $26,277 | $0 | $0 |
| 35 | | $0 | $0 | ($0) | | | $9,072 | $1,339 | $6,250 | $0 | $24,794 | $0 | $0 |
| 36 | | $0 | $0 | ($0) | | | $9,300 | $1,276 | $7,181 | $0 | $23,951 | $0 | $0 |
| 37 | | $0 | $0 | ($0) | | | $9,480 | $1,256 | $8,467 | $0 | $24,194 | $0 | $0 |
| 38 | | $0 | $0 | ($0) | | | $9,672 | $1,274 | $8,870 | $0 | $24,667 | $0 | $0 |
| 39 | | $0 | $0 | ($0) | | | $9,864 | $1,299 | $9,043 | $0 | $25,144 | $0 | $0 |
| 40 | | $0 | $0 | ($0) | | | $10,056 | $1,324 | $9,218 | $0 | $25,630 | $0 | $0 |

ANNUITY VALUE SOFTWARE

TECHNICAL FIELD OF THE INVENTION

The present invention pertains generally to the financial field of insurance and more particularly to a computer implemented system for determining certain values in annuity contracts.

BACKGROUND OF THE INVENTION

In the financial field of insurance, individuals are provided with an opportunity to fund their retirement income through the purchase of annuity contracts. An annuity contract generally involves an insured individual paying money to an insurance company and the insurance company pooling the insured's money with moneys paid by other contract purchasers having reasonably similar retirement funding desires, and investment and survivorship risks. The contract is used to invest the contract holders funds and pay back accumulated moneys primarily as retirement income, usually calibrated as income guaranteed over the lifetime of the annuitant. The annuity contract thus protects an insured individual from the adverse financial consequences associated with living too long.

To provide an insured with such lifetime guaranteed protection generated through the mechanism of an annuity contract, the insurance company studies the statistics associated with investing and people's mortality, adjusting these statistics to recognize the particularities of the contract.

Such contracts are variously called lifetime income, life payout, or immediate life annuities when the contract immediately (within 13 months) begins paying income contingent on the individual living, and deferred annuities when the contract does not begin to pay income out immediately.

Before retirement the financial risk of living is generally funded by an individual on a pay-as-you-go basis from employment earnings. Upon retirement, other sources are needed to provide such moneys. Social Security and private pensions provide some such moneys, and various individuals might receive income moneys from other sources. But for many people, some of whom have no such sources, their own personal assets must be relied upon as the sole or is supplementary source of such moneys.

This often presents a dilemma because of the risk of living too long. The dilemma is that people do not know how long they are going to live. So in the first place, they often do not accumulate sufficient assets. Then, if they dip into principal in addition to earnings on their assets, they could run out of money if they live too long. To be safe, they could take only earnings as income, but such earnings are often not enough, forcing the person to skimp. Moreover, earnings on most investments vary; low earning years may also require a withdrawal from principal. The risk of living too long has been and promises to continue to be a rising concern as more people reach retirement and retired people live longer.

Moreover, faced with this dilemma, inflation can pose an added burden for ever-increasing income, compounding the financial risk of living too long. There are also extra risks and financial strain on retired individuals concerning uninsured health care costs.

Life annuities generally pay specified income amounts to a contract holder at the end of routine intervals, such as monthly or yearly, to which the insured annuitant survives, and in most instances provide this contractual protection for all future intervals the individual lives. In such instances, the amounts of income includes the payout of principal, as well as investment earnings, calibrated over the statistically expected lifetimes of all of the annuitants. As such, life annuities solve the dilemma of the risk of outliving one's savings by safely tapping into principal so as to provide more significant income. Only insurance companies (and certain self-insuring groups) provide such lifetime guarantees connected with tapping into principal.

In establishing the payout amounts in this way, in the purest form of these annuities, pure life only annuities, principal and/or interest are not available after income payments commence, neither for withdrawal nor on or after the annuitant's death. To do otherwise on death negates the calibrated redistribution of these amounts back to surviving annuitants; and to do otherwise on withdrawal has the same effect because moneys could be withdrawn as annuitants neared death.

Since principal is not available on death, even if death occurs before income payments commence under this pure life annuity, insurance companies generally provide miscellaneous options for pay-backs on death. Such death benefit options are generally paid for by a reduction in income level or a corresponding increase in purchase payment. Some of the more common death benefits are: to continue income payments to the beneficiary for the remainder of the first 10 or 20 years from issue; to continue payments until the purchase payment has been paid through income payments, first to the annuitant while alive and then to the beneficiary (called installment refund); or to pay the remainder of the purchase payments in cash at the time of death (called cash refund).

Death benefits options have also been used as the backdrop for giving contract owners liquid access to values in the contract. Thus, to the extent a death benefit option is in effect, contract holders have in certain contracts been given the right to withdraw moneys connected to the death benefit available, subject in some more recent products to charges to recover unamortized acquisition costs and/or adjustments for disintermediation.

Certain contracts have recently also provided for various options to periodically increase the amount of the income payable to offset the effects of inflation. Other contracts, called variable annuities, tie the income amounts to the performance of the investment in separate accounts that are similar to mutual funds. And some others have begun to offer benefits and rate classifications connected to the health of the annuitant.

Although there are many different types of annuity contracts, little has been done to demonstrate and explain the underlying mechanism of life annuities to the public or insurance sales and service people. There has also been a lack of financial disclosure in connection with how life annuity contracts work. A major facet of this shortcoming involves the non-disclosure of certain periodic, mainly yearly, financial components funding values inherent in how these contracts operate both in general and in the individual case. Most particularly, the workings and values of the living factor has not been disclosed.

As such, prospective purchasers and contract holders, and even distributors, quite often do not understand or have limited understanding of what they are buying or selling. They are not aware of the options that might be available, nor are they fully cognizant of the financial implications of their decisions. Decisions are often uneasy, uninformed, and in many instances not what would have been chosen had more been known.

Moreover, component funding values such as living contingent values have not been enhanced, nor have they been integrated into other annuity contract frameworks. The insurer is also less subject to accountability on its ongoing declarations.

Then too, access to values and the value of living have been limited because of underwriting concerns.

There is a need for a system that provides more disclosure of the workings of life annuity contracts so that when the contract is presented to customers they can appreciate and act on all of such contracts' critical components. Likewise, there is a need for a system that will enable such critical components to be enhanced.

SUMMARY

The present invention generally provides a computer-implemented system for determining deferred and immediate annuity contract living contingent and supporting component funding data representing tangible annuity contract values across the life period of a potential or existing annuity contract. The system is comprised of at least a terminal, data storage and a programmed processor. The terminal receives and displays data, including annuitant data that identifies a potential or existing annuitant, annuity contract specification data, annuity contract rate data, and annuity contract purchase value data representing tangible annuity contract purchase values. The data storage is electrically interconnected to the terminal and allows for physical encoding of data, including the annuitant data, the contract specification data, the annuity contract rate data, and the annuity contract purchase value data. The programmed processor is electrically interconnected to the terminal and data storage and processes the data received at the terminal and the data stored in the data storage to physically transform the annuity contract purchase value data into annuity contract living contingent and supporting component funding and related data representing tangible deferred and immediate annuity contract values at one or more selected dates during the life period, and/or determine eligibility for withdrawal, withdrawal values, and transact the payment of a withdrawal value.

BRIEF DESCRIPTION OF THE DRAWINGS

In the drawings, wherein like reference letters and numerals designate corresponding elements throughout the several views:

FIG. 8 is an example of an embodiment displaying the annuity contract living contingent and supporting component funding and related data summarized to an annual basis for the first 40 years on a guaranteed basis for a potential or new deferred or immediate annuity contract with optional return of premium death and contingent withdrawal benefits, and including a comparison to a bank account;

FIG. 9 is an example of an embodiment similar to that disclosed in FIG. 8, except the data is displayed on the basis of projected or updated declared rates for the second and subsequent years illustrated;

Figure 10:
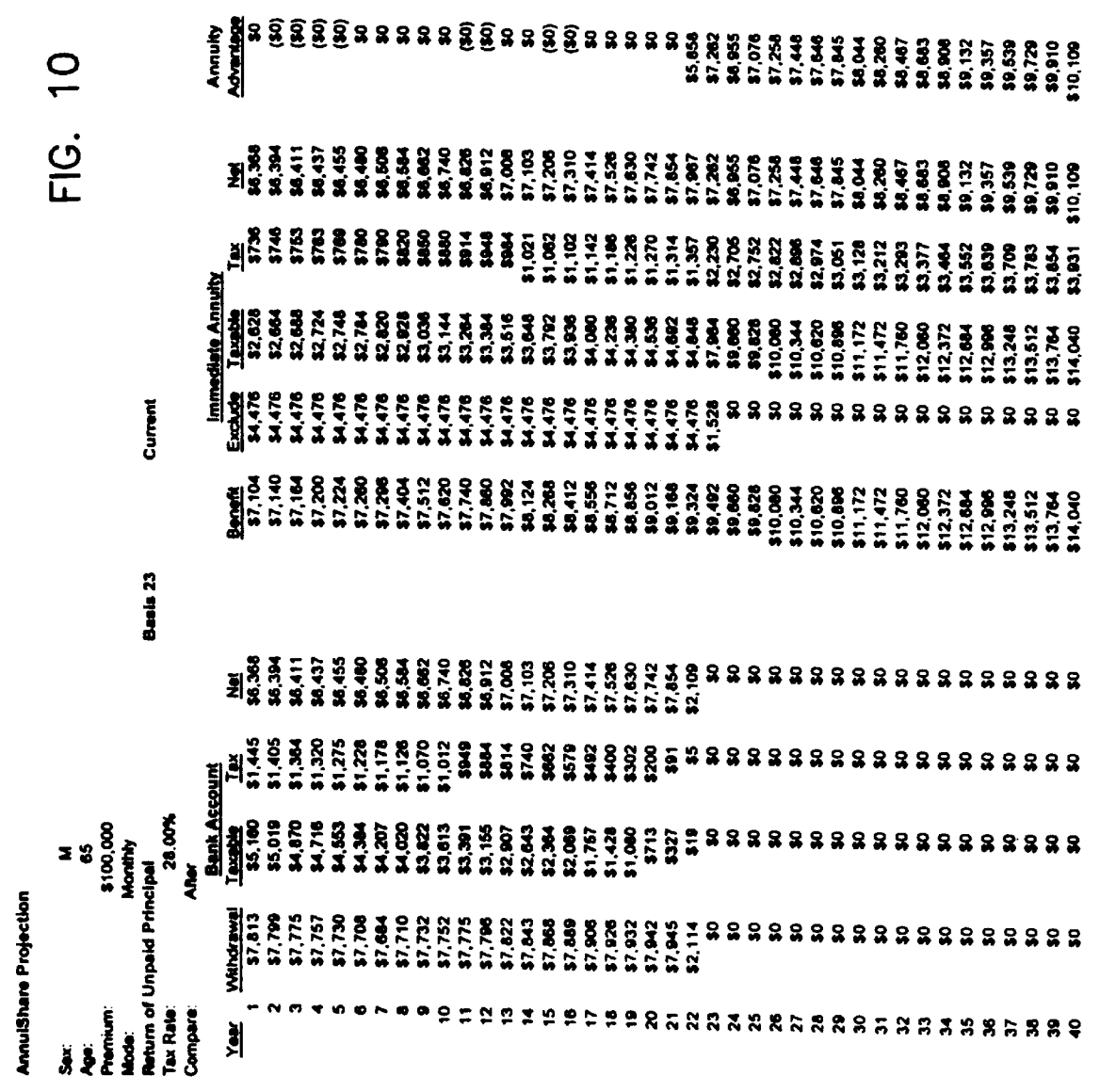

FIG. 10 is an example of an embodiment displaying annuity contract payment and income tax data summarized on an annual basis for the first 40 years on the basis of projected declared rates for the second and subsequent years illustrated, and including a comparison to a bank account; and FIG. 11 is an example of an embodiment related to that disclosed in FIG. 9, except the data displayed shows the effects on the annuity contract living contingent and supporting component funding values of a withdrawal request on an existing annuity contract.

GENERAL DESCRIPTION

Figure 1:
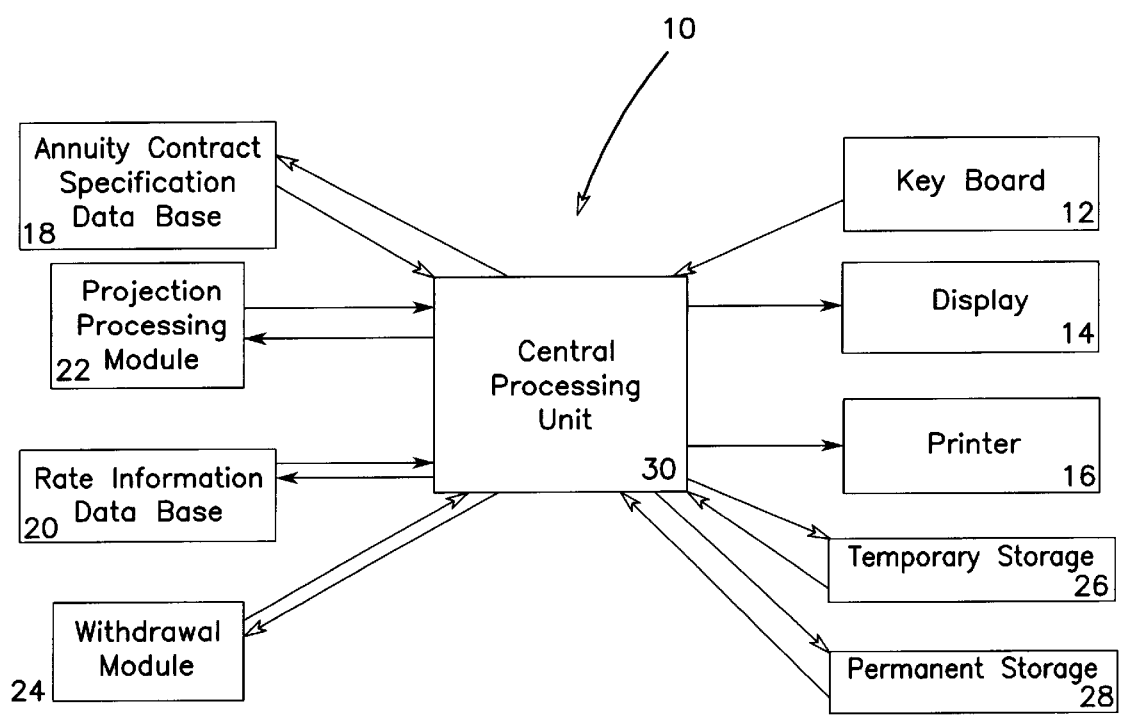
FIG. 1 is a simplified block diagram of a computer implemented system for determining annuity contract component funding data.

A programmed computer 10 controls the processing at a computer terminal of each system user. Each system user's computer terminal is networked to the programmed computer which includes a central processing unit and data storage for storing data files.

The system's programmed computer is engaged by a system user through a computer terminal to determine the living contingent and supporting component funding and related data of a potential or existing annuity contract. The terminal receives and displays data input by a system user. Such annuity contract itemization data includes annuitant data identifying a potential or existing annuitant, annuity contract specification data and annuity contract purchase value data representing tangible annuity contract purchase values. The annuity contract living contingent and supporting component funding and related data represents tangible deferred or immediate annuity contract values across the life period of an annuity contract.

The Program computer 10 prompts the system user through the input of the above data and causes annuitant data, contract specification data, annuity contract rate data, and annuity contract purchase value data to be physically encoded in data storage.

Following storage of the above physically encoded data, the programmed computer 10 processes the annuity contract itemization data, including annuitant data, the annuity contract specification data, the annuity contract purchase value data, and the annuity contract rate data in order to physically transform the deferred or immediate annuity contract purchase value data into deferred or immediate annuity contract life contingent and supporting component funding data that represents tangible deferred or immediate annuity contract values at one or more dates during the life period of the potential or existing annuitant. The life contingent and supporting annuity contract component funding data comprises guaranteed account value data that represents tangible guaranteed account values, living contingent value data that represents tangible living contingent values and supporting annuity contract component funding data representing tangible annuity contract supporting values. Such deferred or immediate annuity contract life contingent and supporting component funding data includes payout data representing tangible contract payout values paid to the contract holder across a payout schedule during the life period defined by the annuity contract specification data. In one embodiment of the invention involving an immediate annuity, the payout schedule is defined as beginning within thirteen months of the start date of the life period. In another embodiment of the invention involving a deferred annuity, the payout schedule is defined as beginning at least thirteen months after the start date of the life period. It is also contemplated that the payout schedule may be implemented in any mode desired by the customer, including but not limited to monthly, quarterly, semi-annually and annually. The payout may also be for as long as the annuitant lives or until a chosen ending date. The start and ending dates and mode of the life period are generated by system processing of the contract specification data.

The program computer also provides for the updating of data physically encoded on data storage. Such updates affect resulting living contingent and supporting component funding and related data and values.

The programmed computer 10 directs the display of selected annuity contract living contingent and supporting component funding and related data onto the system user terminal, onto printed output, and to be encoded in supplemental data storage.

In another embodiment of the invention, the deferred or immediate annuity contract component funding data includes withdrawal option data representing amounts of tangible annuitant withdrawal values a contract holder may withdraw from the annuity contract on a specific date prior to expiration of the life period and withdrawal value request data that is processed to determine eligibility for withdrawal of a tangible annuity contract withdrawal value.

DETAILED DESCRIPTION

In the following detailed description, an embodiment of the present invention is described. In the description, reference is made to the accompanying drawings which form a part hereof and in which is shown by way of depiction an exemplary embodiment and a description having sufficient detail to enable those skilled in the art to practice the invention. It is to be understood that other embodiments may be utilized and that structural or logical changes may be made without departing from the scope of the present invention. The following detailed description is, therefore, not to be taken in a limiting sense, and the scope of the present invention is defined by the appended claims.

Referring to FIG. 1, a simplified block diagram overview of the system is shown. The system includes a keyboard 12 for data entry, selection, and manipulation, a CRT display 14, a printer 16, an Annuity Contract Specifications Data Base 18, a Rate Information Data Base 20, a Projection Processing Module 22, a Withdrawal Module 24, a Temporary Storage Data Base 26, a Permanent Storage Data Base 28, and a Central Processing Unit 30. In the embodiment of the invention described herein, the central processor unit 30 is IBM compatible, operating the MS-DOS operating system in the Microsoft Windows environment. However, it is to be understood that the software for the present invention could be written to run on other computer or calculator systems.

Referring further to FIG. 1, there is shown an overview of data flow between the system's major components. Annuity contract data is inputted by system users at keyboard 12.

Such annuitant data includes, but is not limited to: the name of the annuitant; the age of the annuitant; the date of birth of the annuitant; the gender of the annuitant; the resident address of the annuitant; and information about the health and/or rating of the annuitant.

Such annuity contract purchase value data includes, but is not limited to: the amount of purchase payment value to be deposited into the annuity contract; and the potential or actual purchase date.

Such annuity contract specification data includes, but is not limited to: the plan (such as individual or rated or type of joint coverage); type of death benefit; any optional benefits chosen; the mode of payout such as monthly, quarterly, semi-annually, or annually; the date of the first payout including whether the first payout is within 13 months or not, and the date of the last payout, thereby defining the payout schedule; the type of information and display desired (such as just the income amount, or a guaranteed or current illustration, or the effect of death, withdrawal, or taxes, or a comparison with a bank account, and the years to be shown as applicable); an initial illustration year of one; the date of the illustration if after the initial contract date; if a withdrawal request, additional information such as the amount of money desired or the withdrawal value to be surrendered, the date the withdrawal is desired, under which withdrawal option the money is being requested, and any data needed to determine eligibility for withdrawal. Such annuitant, specification, and purchase value data are stored in the system's annuity contract specification data base 18.

Such annuity contract rate data includes, but is not limited to: guaranteed mortality, interest, and optional benefit cost rates as of the contract date, including any declared rates guaranteed for an initial period after the contract date. For example, in one embodiment, the declared rates are guaranteed for one year's interest and mortality. The annuity contract rate data further includes any declared update rates prior to the illustration period or projections of declared rates beyond the illustration period; state premium tax rates; withdrawal charge rates by contract year of withdrawal; eligibility criteria codes and rates for withdrawals; income tax criteria codes and rates; IRS life expectancy tables; rates for initial high and low initial payout value guesses; and a payout value tolerance measure. Such rate data is stored in the Rate Information Data Base 20.

Annuity contract data is retrieved from the annuity contract specification data base 18 and the Rate Information Data Base 20 when Projection Processing Module 22 is activated by the system user. The Projection Processing Module 22 performs various functions on the information retrieved and outputs physically transformed living contingent and supporting component funding and related data representing tangible values to Temporary Data Storage 26 or Permanent Data Storage 28, from which data is further outputted to display screens 14, Printers 16 or electronic data storage at the system user's terminal. The display and printing of annuity contract, living contingent and supporting component funding and related data that represents living contingent and support values in one embodiment of the invention will include, but is not limited to annuity contract specification and rate data as needed to identify the inputs; account value data representing tangible account value; interest credit data representing tangible interest credit; living credit data representing tangible living credit; optional benefit cost data representing any tangible cost associated with optional benefits; withdrawal data representing tangible value the contract holder may withdraw from the annuity contract; death benefit data representing tangible death benefit values; payout data representing tangible payout values to be paid to the contract holder; and income tax data representing tangible income tax values assessed against the annuity contract, for specified illustration periods, such as, for example, annually for 40 years, and/or guaranteed and assumed or actual declared rates, examples of which are shown in FIGS. 8–11. Encoded data storage of annuity contract living contingent and supporting component funding and related data will include, but will not be limited to similar though more extensive data such as on a monthly rather than on an annual basis.

Figure 2:
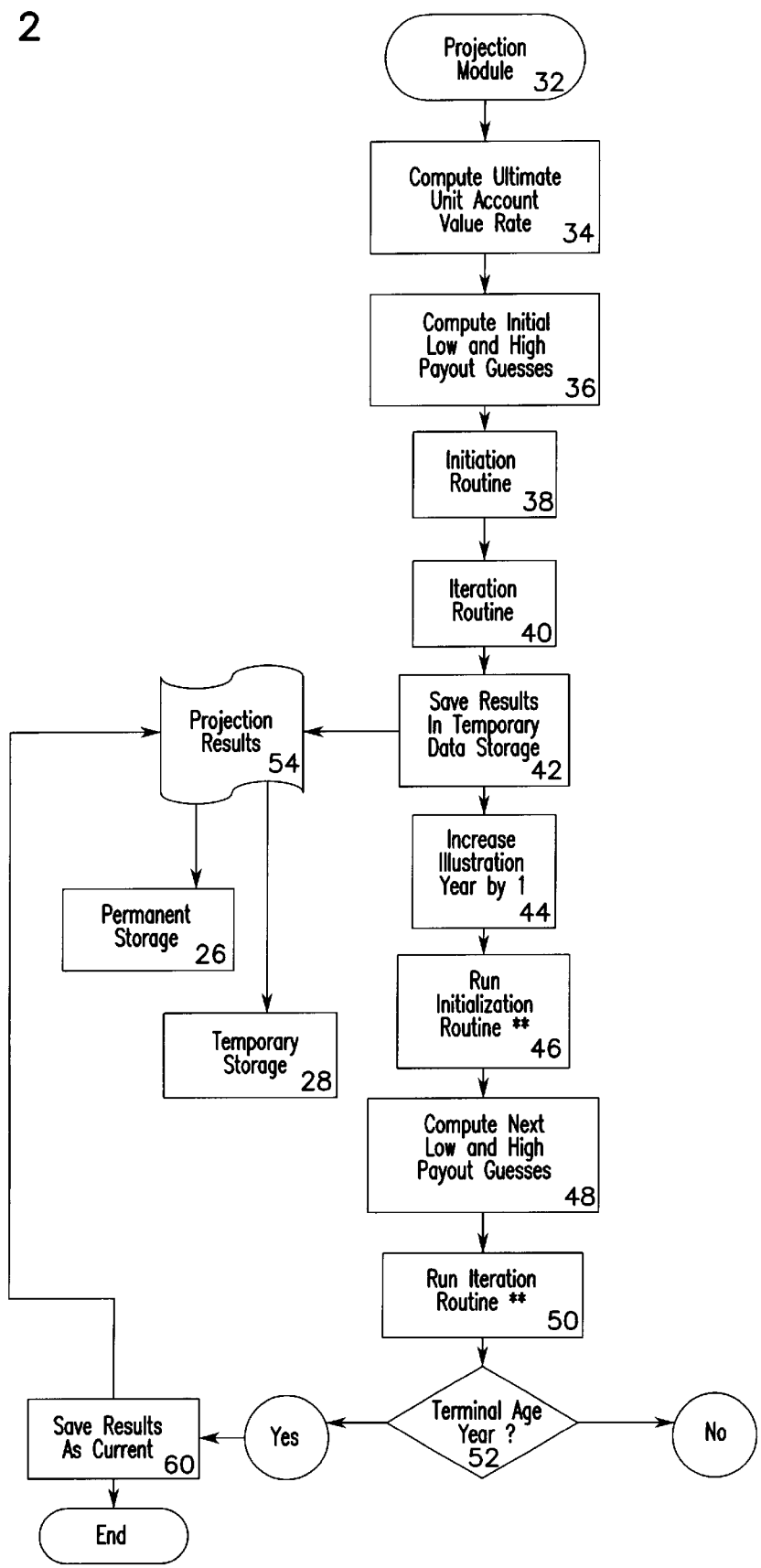
FIG. 2 is a simplified block diagram of the data flow structure of the Projection Module of FIG. 1.

Referring now to FIG. 2, the flow of processing performed by Projection Module 32 is shown. The Projection Module 32 initializes an ultimate unit account value rate 34 by calculating the reciprocal of the sum of the ultimate guaranteed interest rate and the guaranteed living credit rate in the case of the life period continuing for the annuitant's lifetime. Otherwise, the ultimate unit account value is set as zero. The ultimate unit account value rate is the tangible account value which must be available to pay a unit of annuity contract payout value for as long as annuitants of the same class group live after the age at which the mortality rates for these annuitants are assumed to remain constant in the embodiment of the invention described herein. This class group in this embodiment is based on the age and gender of the annuitants, and the ultimate unit account value rate 34 represents the unit account value for annuitants who live to reach age 115, a common ultimate age for annuitants in the insurance industry. However, it is to be understood that the present invention may cover the use of other classifications to define the class group. In another embodiment, the annitant's rating may also be used in determining the living credit rate to be used.

Following the determination of the ultimate unit account value rate 34, the Projection Module 32 estimates initial high and low guesses of annuity contract payout value data 36 which represent first estimates of the guaranteed minimum annuity contract payout value payable at specific times in accordance with a payout schedule across the life period of the annuity contract. The payout schedule is defined in accordance with annuity contract owner's preference set forth in the contract specification data, where the payout schedule may be defined as, for example, annually, semi-annually, quarterly, or monthly. This embodiment outputs values for annual payments. In an immediate annuity contract, the first payment on the payout schedule begins within thirteen months of the start date of the life period. In a deferred annuity contract, the first payment on the payout schedule begins at least thirteen months after the start date of the life period. The payout schedule in this embodiment is for the life of the annuitant. The Projection Module 32 determines these "safe" initial high and low guesses by multiplying the high and low initial payout value guess rates respectively by the annuity contract purchase data.

Figure 3:
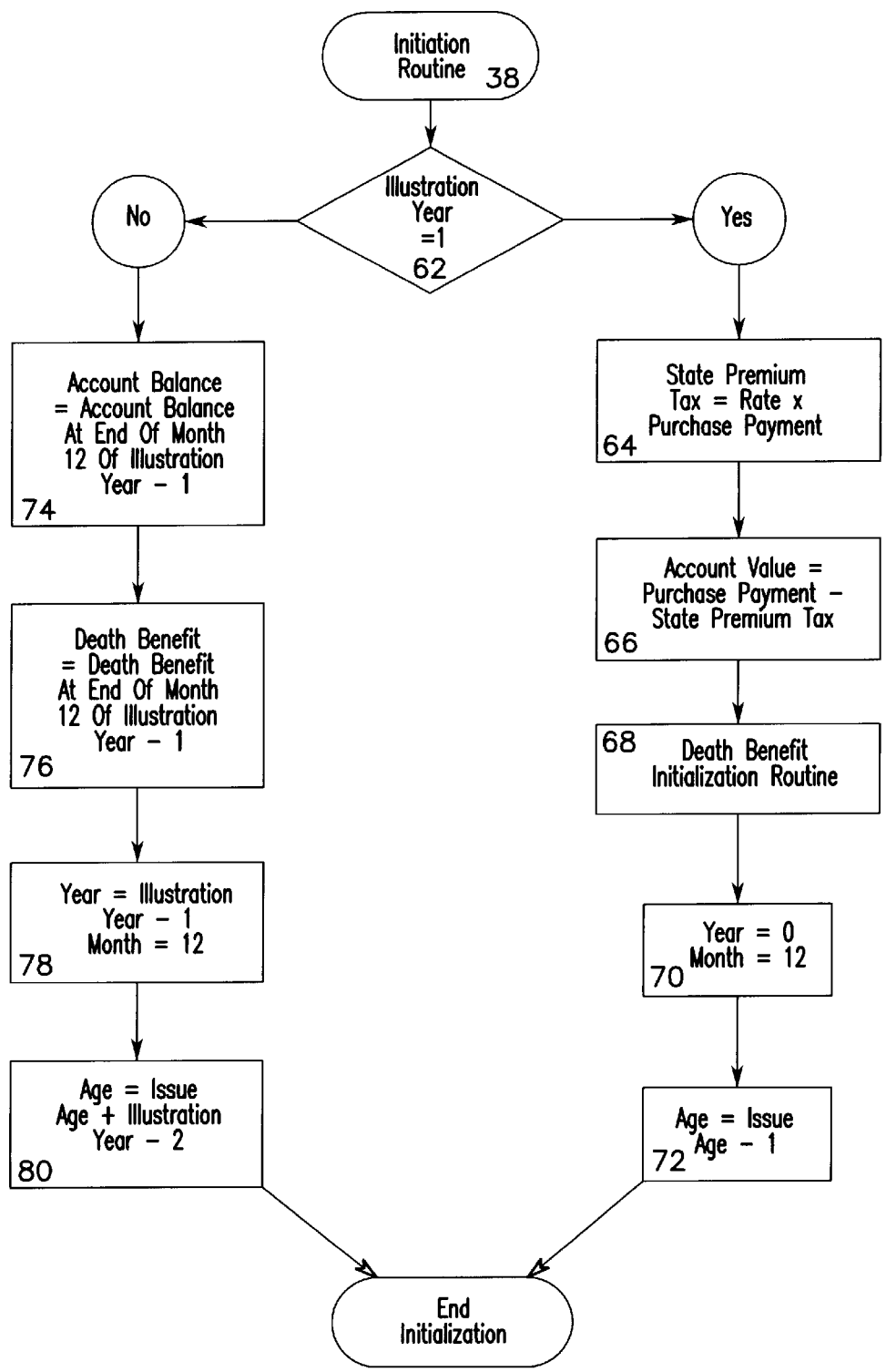
FIG. 3 is a simplified block diagram of data flow structure of the Initiation Routine portion of the Projection Module of FIG. 2.

Next, the Projection Module 32 initializes additional data in the Initiation Routine 38. The Initiation Routine 38 is more clearly illustrated in FIG. 3. As shown in FIG. 3, the Initiation Routine 38 initializes annuity contract value data including account value data representing tangible annuity contract values for the various illustration periods. If in the illustration year, the year for which illustration value data representing tangible annuity contract values are to be determined, is year one 62, the annuity contract account value for year one is determined by first taking the annuity contract purchase data representing annuity contract purchase value and multiplying that data times a state premium tax rate to determine the state premium tax 64.

Next, the beginning account value data representing tangible account value is determined 66 by subtracting from the annuity contract purchase data the previously determined premium tax data. The Projection Module 32 then initiates death benefit data representing death benefit value 68. The Death Benefit Initialization Routine 68 sets the death benefit data based on the type of death benefit encoded from the annuity contract specification data inputted by the system user. If the death benefit type is for no death benefit, the death benefit data will be encoded as zero. In the example used in the present embodiment, the death benefit type is for the return of principal. This death benefit pays an amount equal to the purchase payment less any annuity contract payout values or withdrawal values already paid. The Death Benefit Initialization Routine 68 would set the death benefit data equal to the annuity contract purchase data for this type of death benefit. Likewise, the Death Benefit Initialization Routine 68 would initiate the death benefit data for any other type of death benefit.

Continuing with the processing flow of Projection Module 32, at 70 the Projection Module 32 initializes the year data field to be zero and the month data field to be 12 in order to initiate counters. At 72, the Projection Module 32 initializes the age data field to be the issue age entered by the system user less one to initiate this field as another counter.

If the illustration year at 62 is not year one, the account balance is set equal to the account balance at the end of the 12th month of the prior illustration year 74; the death benefit equal to the system calculated death benefit at the end of the 12th month of the prior illustration year 76; the year equal to the illustration year minus one and the month equal to twelve 78; and the age equal to the issue age plus the illustration year less two 80.

Figure 4:
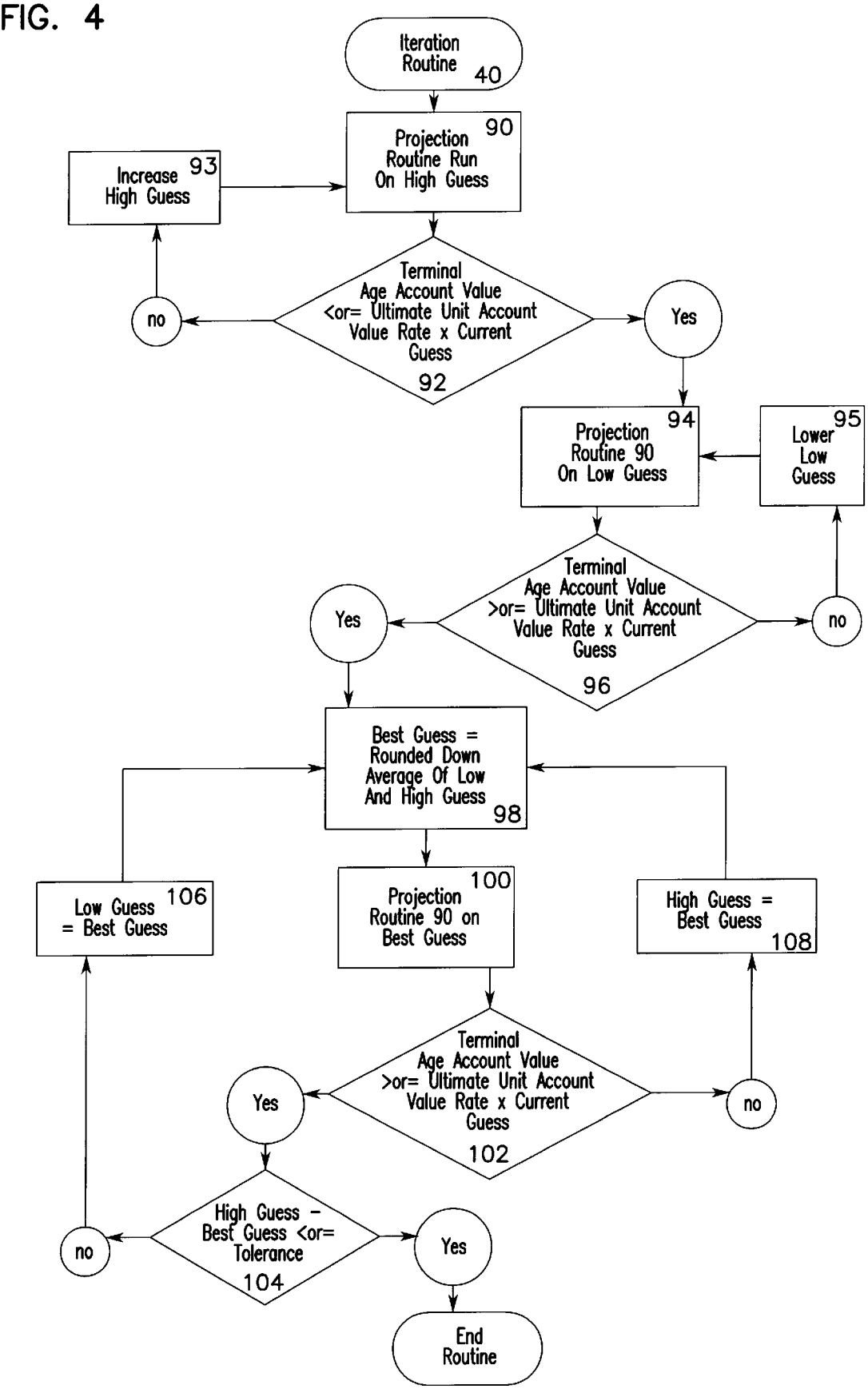
FIG. 4 is a simplified block diagram of data flow structure of the Iteration Routine portion of the Projection Module of FIG. 2.

As shown in FIG. 2, following the Initiation Routine 38, the Projection Module 32 begins Iteration Routine 40 which is depicted more specifically in FIG. 4. As shown in FIG. 4, the Iteration Routine 40 is essentially a trial and error routine to calculate the annuity contract payout value for the illustration year based on the annuitant data, annuity contract specification data, annuity contract rate data, and annuity contract purchase data representing the annuity contract purchase value.

The Iteration Routine 40 initially uses the high guess of the initial annuity contract payout amount that was initialized at 36 to project component fund values to age 115 in the present embodiment, or the specified ending date, using the Projection Routine 90. The Projection Routine 90 is depicted in FIG. 5.

Figure 5:
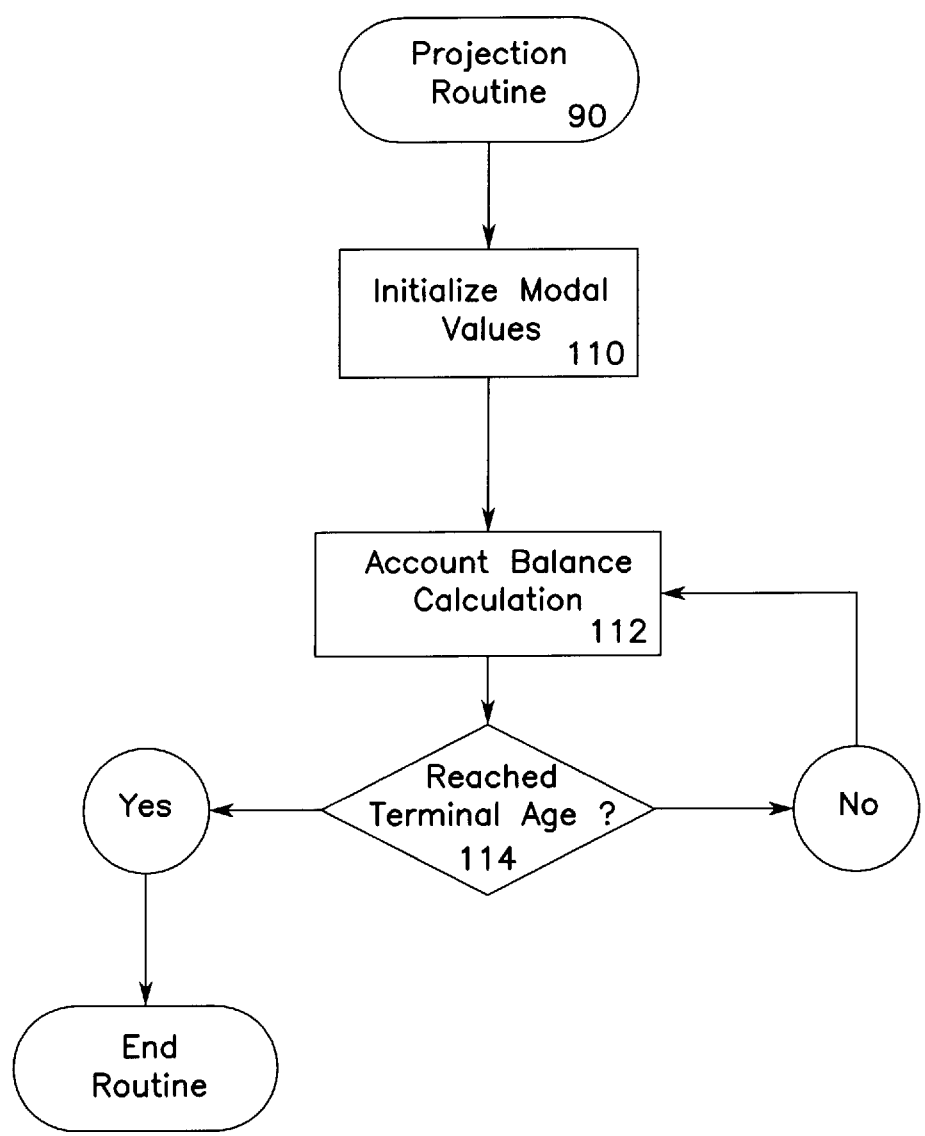
FIG. 5 is a simplified block diagram of data flow structure of the Projection Routine of the Iteration Routine of FIG. 4.

As shown in FIG. 5 the Projection Routine 90 processes the annuity contract payout guess by first initializing a modal value 110 as to how often to calculate account balances during a year. In the present embodiment the modal period is one month—12 months to the year. Then Projection Routine 90 runs a loop and performs the account balance calculation 112 for each month and year across the predefined period until the terminal age, one hundred fifteen in the present embodiment of the invention, or the specified ending date is reached 114. The account value calculation is depicted more specifically in FIG. 6.

Figure 6:
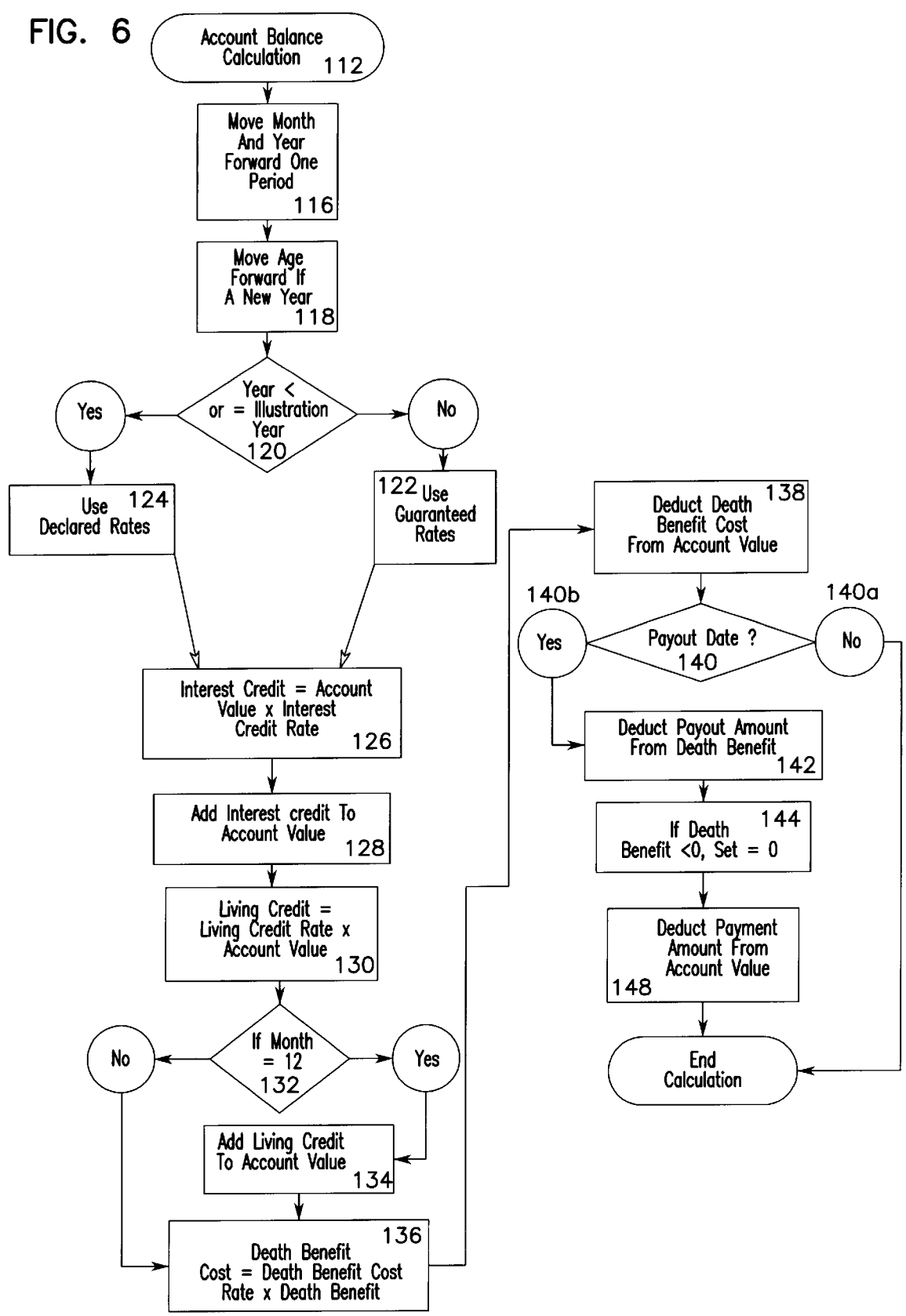
FIG. 6 is a simplified block diagram of data flow structure of the Account Balance Calculation portion of the Projection Routine of FIG. 5.

As shown in FIG. 6, the account value calculation begins with an incrementation of the month, and year as appropriate, for each modal loop 116. Next, the Projection Module 32 moves the age forward if the calculation being performed is for a new year 118. If the year is greater than the illustration year at 120, the system utilizes at 122 guaranteed rates from the Rate Information Data Base 20 to perform component funding data calculations. If the year is less than or equal to the first year at 120, the projection routine utilizes declared rates, or updated declared rates where the specification data indicates that the illustration date is on an existing contract 124, from the Rate Information Data Base 20. Based on the applicable rates, the Account Balance Calculation 112 determines the interest crediting rate for the month and the interest credit is then determined as being equal to the Account Value times the interest credit rate 126. After calculating the interest credit, the interest credit is added to the Account Value 128. The living credit is calculated 130 by multiplying the living credit rate for the current year for the age and gender of the annuitant under the present embodiment, by the Account Value. After the living credit has been calculated, if the month is 12 under this embodiment 132, the living credit is added to the account value 134. Otherwise, the Account Balance Calculation continues without recording the living credit under this embodiment.

Next, the death benefit cost is calculated 136 by calculating the optional death benefit cost rate times the death benefit data, the result of which is deducted from the Account Value 138. If the date for which the calculation being made is not the date a payout value is to be made, the Account Balance Calculation ends 140a. However, if it is a payout value date 140b, the Account Value Calculation 112 deducts the payout amount from the death benefit data 142 and sets the death benefit data equal to zero if it is negative 144. Finally, the payout value is deducted from the account value 148. The Account Value Calculation 112 for that month is then completed whether a payout is to be incorporated or not.

As shown in FIG. 5, once the terminal age of one-hundred-fourteen or the life period ending date is reached, 114, Projection Routine 90 ends and the Projection Module 32 returns to 92 (See FIG. 4) to test the account value at the terminal age as compared to the ultimate unit account value.

As shown in FIG. 4, if the terminal age account value then is not less than or equal to the ultimate unit account value rate multiplied by the current payout amount guess 90, then the Iteration Routine 40 increases the high guess payment value 93 and the Projection Routine 90 is run again. If the terminal age account value is less than or equal to the ultimate unit account value 92, then at 94, the Projection Routine 90 (shown in FIG. 5) is run based on the low guess from 36. If the terminal age account value of this low guess is not greater than or equal to a recalculated ultimate unit account value 96, then the Iteration Routine 40 decreases the lower guess at 95. The lower guess payout value is processed again 94 and the terminal age account value is then compared again at 96 to see if it is greater than or equal to another new ultimate unit account value. If the terminal age account value at 96 is greater than or equal to the ultimate unit account value, the Iteration Routine averages the last low and high guesses, rounded down to determine a best guess at 98. Next, the Projection Routine 90 on the best guess 100 is run and the resulting terminal age account value is compared to another calculated ultimate unit account value 102. If the terminal age account value is not greater than or equal to this ultimate unit account value then the high guess is set to the best guess 108, and 98 and 100 are performed again. If the terminal age account value is greater than or equal to the new ultimate unit account value the best guess is subtracted from the high guess and compared to the payout value tolerance measure 104. If the difference is not less than or equal to the tolerance measure then the low guess is set to the best guess 106 and reprocessed through 98–108. If the difference is less than or equal to the tolerance measure 106, the iteration routine ends and all component funding values and identifying specification and annuitant data for all modal periods through the terminal age are stored 42, and some displayed and/or printed as specified by the input.

As shown in FIG. 2, at 44, illustration year is increased by 1. At 46 "38" shown in FIG. 3 is run again but for illustration years higher than one with 74, 76, 78 and 80 being advanced analogously to 64, 66, 68, 70 and 72. 48 computes new high and low guesses based on the prior year payout and guess rate data, and 50 uses the Iteration Routine 40 shown in FIG. 4 to calculate a new payout amount. This loop is run for all ages through the terminal age 52 and stored in 60, displayed and printed as above for 42 and 54.

Figure 7A:
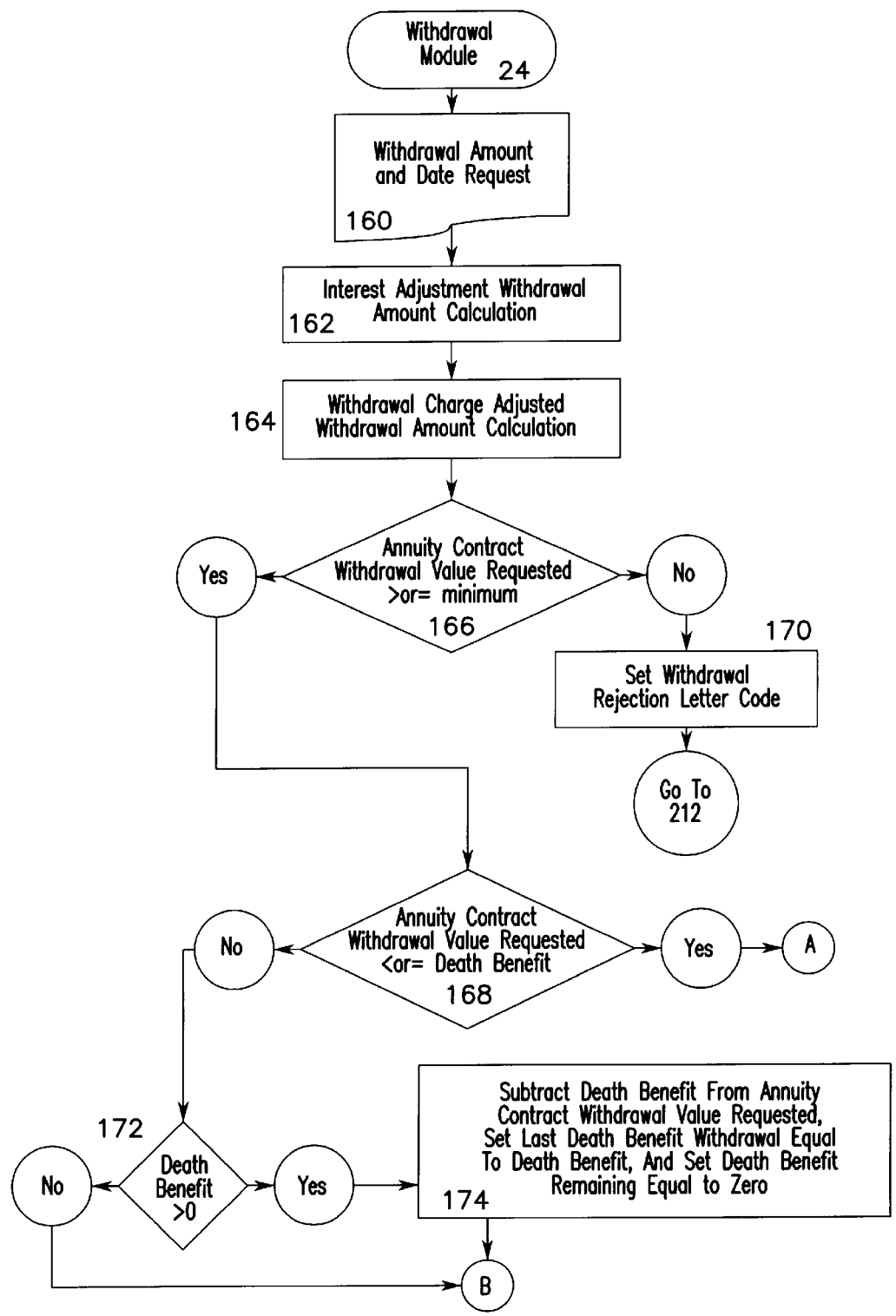
FIGS. 7A, 7B and 7C are a simplified block diagram of the data flow structure of the Withdrawal Module of FIG. 1.
Figure 7B:
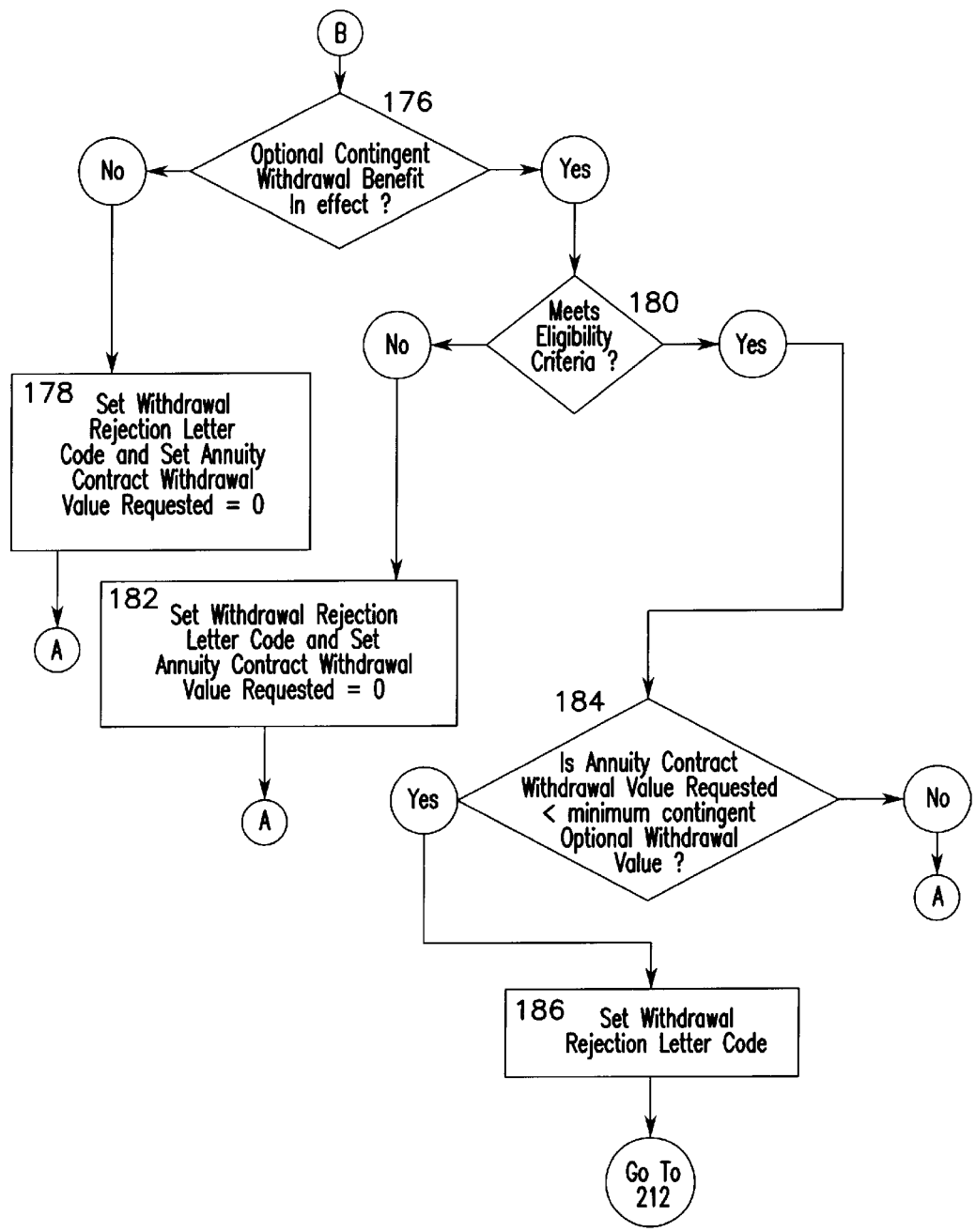
Figure 7C:
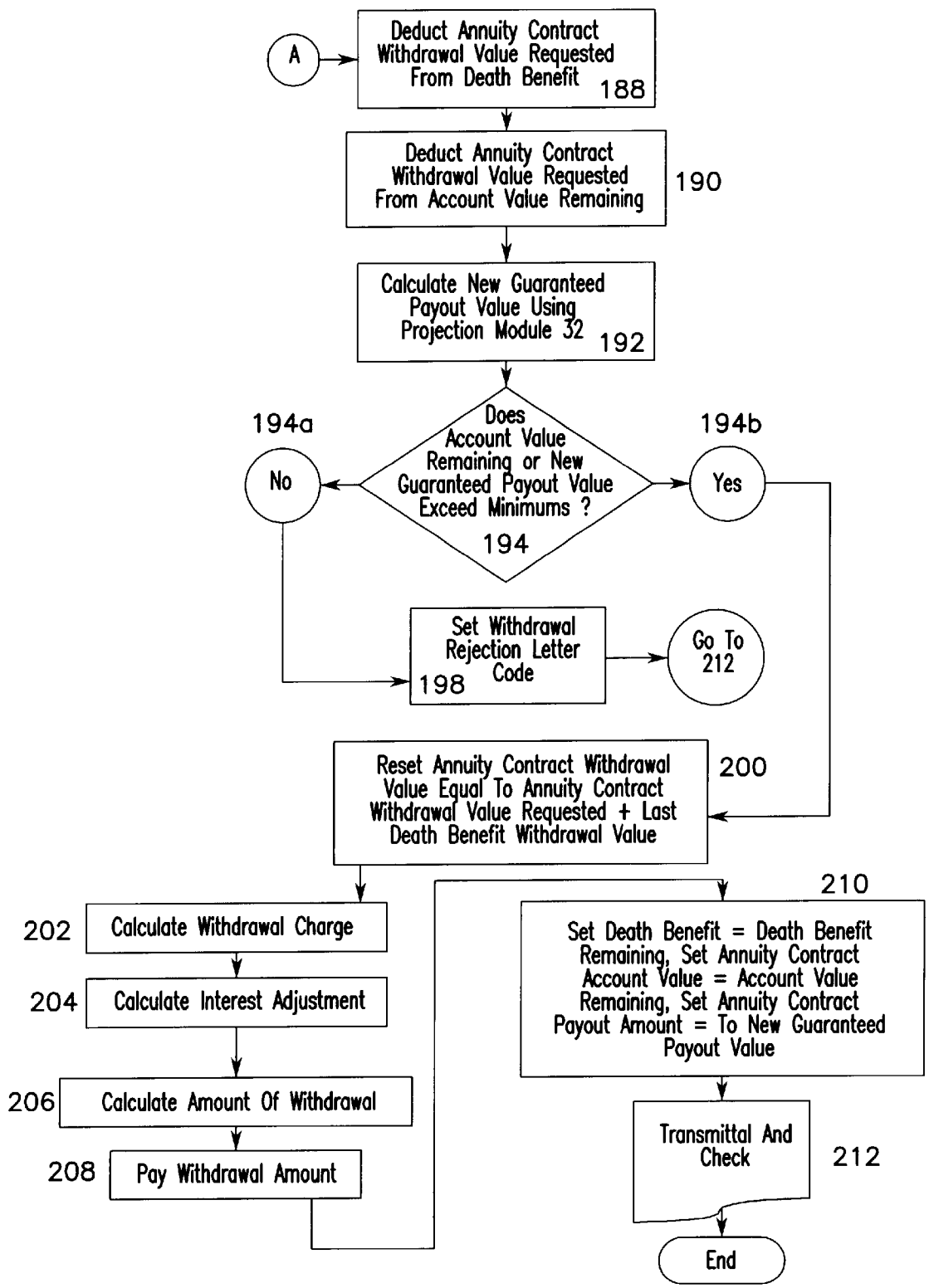

FIGS. 7A, 7B and 7C depicts a Withdrawal Module 24 process which begins at 7A with a system user inputting in the embodiment depicted the Withdrawal Amount the contract holder seeks and the date the contract holder desires the withdrawal 160. The Withdrawal Amount is then adjusted for interest by dividing the Annuity Contract Withdrawal Amount Requested by an Interest Adjustment Withdrawal Amount Calculation 162. Next, the Withdrawal Module calculates the gross Annuity Contract Withdrawal Value requested to be withdrawn 164 which represents Annuity Contract Withdrawal Value by dividing the Interest Adjusted Withdrawal Value Requested by the complement of the Withdrawal Charge Rate. The resulting Annuity Contract Withdrawal Value requested is then tested to see if it equals or exceeds the minimum available 166. If the Annuity Contract Withdrawal Value Requested is less than the minimum 166, a Withdrawal Rejection Letter Code is set 170 and transmitted 212. If the Annuity Contract Withdrawal Value Requested exceeds or equals the minimum available, then it is compared with the Death Benefit Data to see if the Annuity Contact Withdrawal Value Requested is less than or equal to the Death Benefit Data 168. If the Annuity Contract Withdrawal Value Requested is not less than the Death Benefit Data 168, the system checks at 172 to see how much can be withdrawn under any optional death benefit and, if yes, at 174 subtracts the amount that can be withdrawn through the optional death benefit by subtracting the Death Benefit Data from the Annuity Contract Withdrawal Value Requested, setting the Last Death Benefit Withdrawal Value Data to the Death Benefit Data, and setting the Death Benefit Remaining to zero. Then, or if the Death Benefit data is not greater than zero at 172, the system checks as to whether a Contingent Optional Withdrawal Benefit, such as one contingent on the annuitant's good health, dread disease, average life expectancy, chronic disability status, or on the timing of the request, is in effect as inputted by a system user 176 (shown in FIG. 7B). If the annuity contract does not have such a Contingent Optional Withdrawal Benefit in effect, the request for the withdrawal of funds from the Account Value on account of a Contingent Optional Withdrawal Benefit is rejected by setting a Withdrawal Rejection Letter Code and setting the Annuity Contract Withdrawal Value Requested equal to zero 178 and continuing at 188 (shown in FIG. 7C). If the annuity contract has a Contingent Optional Withdrawal Benefit 176, the system determines if the annuitant meets eligibility criteria for withdrawal 180. The determination of whether an individual meets particular criteria is determined by processing the annuitant and specification data that pertains to the particular contingencies involved. If the eligibility criteria are not met, the request for withdrawal on account of this Contingent Optional Withdrawal Benefit is rejected by setting a Withdrawal Rejection Letter Code and setting the Annuity Contract Withdrawal Value Requested equal to zero 182 and continuing at 188 (shown in FIG. 7C). If the eligibility criteria are met 180, the system tests if the Annuity Contract Withdrawal Value Requested is less than the minimum Contingent Optional Withdrawal Value Request available 184. If it is not less, the system continues processing at 188 as described below. If it is less, the system sets a Withdrawal Rejection Letter Code 186 and transmits a letter 212. As shown in FIG. 7A, if the Annuity Contract Withdrawal Value Requested is less than or equal to the Death Benefit Data 168, the Withdrawal Module 24 deducts the Annuity Contract Withdrawal Value Requested from the Death Benefit Remaining 188 (shown in FIG. 7C) and then deducts the Annuity Contract Withdrawal Value Requested from the Annuity Contract Account Value Remaining 190. Both the Annuity Contract Account Value Remaining and the Death Benefit Remaining represent Annuity Contract Values. The system then recalculates New Guaranteed Payout Value based on the Annuity Account Value Remaining 192, using the Projection Module 32. If the Annuity Contract Account Value Remaining or the recalculated New Guaranteed Payout Value do not exceed specified minimums based on stored Annuity Contract Rate Data 194a, the system sets an appropriate Withdrawal Rejection Letter Code 198 and transmits the letter at 212. If the Annuity Contract Account Value Remaining and the new Guaranteed Payout Value do exceed the stored minimums, the system sets Annuity Contract Withdrawal Value equal to the sum of the Last Death Benefit Withdrawal Value and the Annuity Contract Withdrawal Value Requested 200, and calculates a Withdrawal Charge 202 equal to the Annuity Contract Withdrawal Value times the Withdrawal Charge Rate. An Interest Adjustment 204 is then calculated by multiplying the Annuity Contract Withdrawal Value by the Interest Adjustment Rate. The net Withdrawal Amount Paid is then determined to be equal to the Annuity Contract Withdrawal Value less the Withdrawal Charge and less the Interest Adjustment 206. The system then authorizes payment of the Withdrawal Value to the contract holder, 208, sets the Death Benefit equal to the Death Benefit Remaining, the Annuity Contract Account Value equal to the Annuity Contract Account Value Remaining, and the Annuity Contract Payout Value equal to the New Guaranteed Payout Value 210. The system finally prepares an appropriate transmittal letter based on the applicable withdrawal Letter Code and a check is mailed if applicable 212.

What is claimed:

1. A computer-implemented system for determining living contingent and supporting annuity contract component funding data representing tangible annuity contract values across a life period of a potential or existing annuity contract, comprising:

(a) terminal means for receiving and displaying annuity contract data, including annuitant data identifying a potential or existing annuitant, annuity contract specification data, annuity contract rate data, and annuity contract purchase value data representing tangible annuity contract purchase values;

(b) data storage electronically coupled to said terminal means for physically encoding data in a storage medium, said encoded data including said annuitant data, said annuity contract specification data, said annuity contract rate data, and said annuity contract purchase value data;

(c) programmed processor means, electronically coupled to said terminal means and said data storage, for processing said data received at said terminal and said data encoded in said data storage, said programmed processor means including program means for processing said annuitant data, said annuity contract specification data, said annuity contract rate data and said annuity contract purchase value data, to physically transform said encoded annuity contract purchase value data to physically encoded living contingent and supporting annuity contract component funding data representing tangible annuity contract values at one or more selected dates during the life period;

said program processor means comprising means for directing the display of said physically transformed and encoded living contingent and supporting annuity contract component funding data through said terminal means in order to display a representation of said tangible annuity contract values;

said program processor means comprising means for processing said annuitant data, said annuity contract specification data, said annuity contract rate data and said annuity contract purchase value data, to generate payout data representing tangible contract payout values at specific times during the life period, said tangible contract payout values being payable to a contract holder on a payout schedule defined by said annuity contract specification data, said payout schedule beginning within thirteen months of the start date of the life period; and (d) a printer electronically coupled to said programmed processor means for output of said physically transformed and encoded living contingent and supporting annuity contract component funding data in order to output a representation of said tangible annuity contract values.

2. The system of claim 1 wherein said program processor means comprises means for defining the life period by processing said annuity contract specification data to generate a start date and an end date of the life period.

3. The system of claim 1 wherein said program processor means comprises means for defining the life period by processing said annuity contract specification data to generate a beginning date of the life period, the life period continuing to a specified ending date.

4. The system of claim 1 wherein said program processor means comprises means for defining said payout schedule for said payments to be made to a contract holder by processing said contract specification data, said payout schedule being defined as annually during the life period.

5. The system of claim 1 wherein said program processor means comprises means for defining said payout schedule for said payments to be made to a contract holder by processing said contract specification data, said payout schedule being defined as monthly during the life period.

6. A computer-implemented system for determining living contingent and supporting annuity contract component funding data representing tangible annuity contract values across a life period of a potential or existing annuity contract, comprising:

(a) terminal means for receiving and displaying annuity contract data, including annuitant data identifying a potential or existing annuitant, annuity contract specification data, annuity contract rate data, and annuity contract purchase value data representing tangible annuity contract purchase values;

(b) data storage electronically coupled to said terminal means for physically encoding data in a storage medium, said encoded data including said annuitant data, said annuity contract specification data, said annuity contract rate data, and said annuity contract purchase value data;

(c) programmed processor means, electronically coupled to said terminal means and said data storage, for processing said data received at said terminal and said data encoded in said data storage, said programmed processor means including program means for processing said annuitant data, said annuity contract specification data, said annuity contract rate data and said annuity contract purchase value data, to physically transform said encoded annuity contract purchase value data to physically encoded living contingent and supporting annuity contract component funding data representing tangible annuity contract values at one or more selected dates during the life period;

said program processor means comprising means for directing the display of said physically transformed and encoded living contingent and supporting annuity contract component funding data through said terminal means in order to display a representation of said tangible annuity contract values;

said program processor means comprising means for processing said annuitant data, said annuity contract specification data, said annuity contract rate data and said annuity contract purchase value data, to generate payout data representing tangible contract payout values at specific times during the life period, said tangible contract payout values being payable to a contract holder on a payout schedule defined by said annuity contract specification data, said payout schedule beginning at least thirteen months after the start date of the life period and;

(d) a printer electronically coupled to said programmed processor means for output of said physically transformed and encoded living contingent and supporting annuity contract component funding data in order to output a representation of said tangible annuity contract values.

7. The system of claim 6 wherein said program processor means comprises means for defining the life period by processing said annuity contract specification data to generate a start date and an end date of the life period.

8. The system of claim 6 wherein said program processor means comprises means for defining the life period by processing said annuity contract specification data to generate a beginning date of the life period, the life period continuing to a specified ending date.

9. The system of claim 6 wherein said program processor means comprises means for defining said payout schedule for said payments to be made to a contract holder by processing said contract specification data, said payout schedule being defined as annually during the life period.

10. The system of claim 6 wherein said program processor means comprises means for defining said payout schedule for said payments to be made to a contract holder by processing said contract specification data, said payout schedule being defined as monthly during the life period.

11. A computer-implemented system for determining living contingent and supporting annuity contract component funding data representing tangible annuity contract values across a life period of a potential or existing annuity contract, comprising:

(a) terminal means for receiving and displaying annuity contract data, including annuitant data identifying a potential or existing annuitant, annuity contract specification data, annuity contract rate data, and annuity contract purchase value data representing tangible annuity contract purchase values;

said terminal means further including a means for updating said data physically encoded in said data storage;

(b) data storage electronically coupled to said terminal means for physically encoding data in a storage medium, said encoded data including said annuitant data, said annuity contract specification data, said annuity contract rate data, and said annuity contract purchase value data;

(c) programmed processor means, electronically coupled to said terminal means and said data storage, for processing said data received at said terminal and said data encoded in said data storage, said programmed processor means including program means for processing said annuitant data, said annuity contract specification data, said annuity contract rate data and said annuity contract purchase value data, to physically transform said encoded annuity contract purchase value data to physically encoded living contingent and supporting annuity contract component funding data representing tangible annuity contract values at one or more selected dates during the life period;

said program processor means comprising means for directing the display of said physically transformed and encoded living contingent and supporting annuity contract component funding data through said terminal means in order to display a representation of said tangible annuity contract values;

said program processor means further comprising means for processing said updated physically encoded data, effecting changes in said living contingent and supporting annuity contract component funding data, thereby generating updates in said annuity contact values;

said data physically encoded including said annuity contract rate data.

12. A computer-implemented system for determining living contingent and supporting annuity contract component funding data representing tangible annuity contract values across a life period of a potential or existing annuity contract, comprising:

(a) terminal means for receiving and displaying annuity contract data, including annuitant data identifying a potential or existing annuitant, annuity contract specification data, annuity contract rate data, and annuity contract purchase value data representing tangible annuity contract purchase values;

(b) data storage electronically coupled to said terminal means for physically encoding data in a storage medium, said encoded data including said annuitant data, said annuity contract specification data, said annuity contract rate data, and said annuity contract purchase value data;

(c) programmed processor means, electronically coupled to said terminal means and said data storage, for processing said data received at said terminal and said data encoded in said data storage, said programmed processor means including program means for processing said annuitant data, said annuity contract specification data, said annuity contract rate data and said annuity contract purchase value data, to physically transform said encoded annuity contract purchase value data to physically encoded living contingent and supporting annuity contract component funding data representing tangible annuity contract values at one or more selected dates during the life period, said living contingent and supporting annuity contract component funding data comprising guaranteed account value data representing tangible guaranteed account values, living contingent value data representing tangible living contingent values and supporting annuity contract component funding data representing tangible annuity contract support values;

said program processor means comprising means for directing the display of said physically transformed and encoded living contingent and supporting annuity contract component funding data through said terminal means in order to display a representation of said tangible annuity contract values.

13. A method of computing living contingent and supporting annuity contract component funding data representing tangible annuity contract values across the life period of a potential or existing annuity contract comprising the steps of:

(a) entering a plurality of annuity contract itemization data including annuity contract purchase value data representing tangible annuity contract purchase values;

(b) encoding said annuity contract itemization data in an annuity contract specification data base;

(c) retrieving annuity contract rate data stored in a rate information data base;

(d) processing said encoded annuity contract itemization data and said annuity contract rate data in order to physically transform said encoded annuity contract purchase value data to physically encoded living contingent and supporting annuity contract component funding data representing tangible living contingent and supporting annuity contract values at one or more selected dates during the life period;

said processing step includes the step of generating payout data representing tangible contract payout values, said payout data being payable at specified times on a payout schedule across the life period of the annuity contract; said payout schedule being defined as beginning within thirteen months of the start date of the life period and;

(e) displaying on a terminal said living contingent and supporting annuity contract component funding data at one or more selected times across the life period of said annuity contract in order to display a representation of said tangible living contingent and supporting annuity contract values.

14. The method of claim 13 wherein said processing step includes defining said payout schedule for payment of said tangible contract payout values as annual by processing contract specification data.

15. The method of claim 13 wherein said processing step includes defining said payout schedule for payment of said tangible contract payout values as monthly by processing annuity contract specification data.

16. A method of computing living contingent and supporting annuity contract component funding data representing tangible annuity contract values across the life period of a potential or existing annuity contract comprising the steps of:

(a) entering a plurality of annuity contract itemization data including annuity contract purchase value data representing tangible annuity contract purchase values;

(b) encoding said annuity contract itemization data in an annuity contract specification data base;

(c) retrieving annuity contract rate data stored in a rate information data base;

(d) processing said encoded annuity contract itemization data and said annuity contract rate data in order to physically transform said encoded annuity contract purchase value data to physically encoded living contingent and supporting annuity contract component funding data representing tangible living contingent and supporting annuity contract values at one or more selected dates during the life period;

said processing step includes the step of generating payout data representing tangible contract payout values, said payout data being payable at specified times on a payout schedule across the life period of the annuity contract; said payout schedule defined as beginning at least thirteen months after the start date of the life period and;

(e) displaying on a terminal said living contingent and supporting annuity contract component funding data at one or more selected times across the life period of said annuity contract in order to display a representation of said tangible living contingent and supporting annuity contract values.

17. The method of claim 16 wherein said processing step includes defining said payout schedule for payment of said tangible contract payout values as annual by processing contract specification data.

18. The method of claim 16 wherein said processing step includes defining said payout schedule for payment of said tangible contract payout values as monthly by processing annuity contract specification data.

19. A method of computing living contingent and supporting annuity contract component funding data representing tangible annuity contract values across the life period of a potential or existing annuity contract comprising the steps of:

(a) entering a plurality of annuity contract itemization data including annuity contract purchase value data representing tangible annuity contract purchase values;

(b) encoding said annuity contract itemization data in an annuity contract specification data base;

(c) retrieving annuity contract rate data stored in a rate information data base;

(d) processing said encoded annuity contract itemization data and said annuity contract rate data in order to physically transform said encoded annuity contract purchase value data to physically encoded living contingent and supporting annuity contract component funding data representing tangible living contingent and supporting annuity contract values at one or more selected dates during the life period;

(e) displaying on a terminal said living contingent and supporting annuity contract component funding data at one or more selected times across the life period of said annuity contract in order to display a representation of said tangible living contingent and supporting annuity contract values; and processing updated rate data in performing steps (c)–(e).

20. A method of computing living contingent and supporting annuity contract component funding data representing tangible annuity contract values across the life period of a potential or existing annuity contract comprising the steps of:

(a) entering a plurality of annuity contract itemization data including annuity contract purchase value data representing tangible annuity contract purchase values;

(b) encoding said annuity contract itemization data in an annuity contract specification data base;

(c) retrieving annuity contract rate data stored in a rate information data base;

(d) processing said encoded annuity contract itemization data and said annuity contract rate data in order to physically transform said encoded annuity contract purchase value data to physically encoded living contingent and supporting annuity contract component funding data representing tangible living contingent and supporting annuity contract values at one or more selected dates during the life period;

said processing step further including the steps of:
  (i) processing a withdrawal value request;
  (ii) processing withdrawal option data to determine eligibility for withdrawal of tangible annuity contract values; and
  (iii) processing withdrawal value data to determine amounts of said tangible annuity contract values a contract holder may withdraw from said annuity contract during the life period prior to expiration of a withdrawal option date and to determine the remaining amounts of said living contingent and supporting annuity contract data representing said tangible annuity contract values; and (e) displaying on a terminal said living contingent and supporting annuity contract component funding data at one or more selected times across the life period of said annuity contract in order to display a representation of said tangible living contingent and supporting annuity contract values.

21. A computer program product comprising a computer usable medium having computer readable program code embodied therein for causing a computer to construct a data set comprised of living contingent and supporting annuity contract component funding data that represents tangible living contingent and supporting annuity contract values across a life period of a potential or existing annuity contract comprising the steps of:
  (a) reading a plurality of annuity contract itemization data including annuity contract purchase value data representing tangible annuity contract purchase values;
  (b) encoding said annuity contract itemization data in a contract specification data base;
  (c) retrieving annuity contract rate data stored in a rate information data base;
  (d) invoking, in response to said encoding of said annuity contract itemization data and said retrieving of said annuity contract rate data, a projection processor module;
  (e) generating the living contingent and supporting annuity contract component funding data representing tangible living contingent and supporting annuity contract values from said projection processor module processing said encoded annuity contract itemization data including annuity contract purchase value data representing tangible annuity contract purchase values and said annuity contract rate data; and
  (f) outputting the data set including living contingent and supporting annuity contract component funding data at specified times across the life period of the potential or existing annuity contract in order to output a representation of said tangible living contingent and supporting annuity contract values.

22. The computer implemented product of claim 21 wherein said outputting of the document can be performed using a printer.

23. The computer implemented product of claim 21 wherein said outputting of the document can be performed using a computer terminal.

24. A computer program product comprising a computer usable medium having computer readable program code embodied therein for causing a computer to determine eligibility and amounts of tangible values that may be withdrawn from and remain in a potential or existing living contingent annuity contract comprising the steps of:
  (a) reading a plurality of annuity contract itemization data including annuity contract purchase value data representing tangible annuity contract purchase values;
  (b) encoding said annuity contract itemization data in a contract specification data base;
  (c) receiving withdrawal value request data representing a withdrawal value request;
  (d) retrieving annuity contract rate data stored in a rate information data base;
  (e) invoking, in response to said encoding of said annuity contract itemization data and said retrieving of said annuity contract rate data, a withdrawal module;
  (f) determining eligibility for withdrawal of a tangible annuity contract withdrawal value requested through said withdrawal module processing said encoded annuity contract itemization data, said withdrawal value request data and said annuity contract rate data; and
  (g) identifying tangible amounts available for withdrawal from the living contingent and supporting annuity contract component funding values, as well as remaining living contingent and supporting annuity contract component funding values, through said withdrawal module processing said encoded annuity contract itemization data, said withdrawal value request data and said annuity contract rate data; and
  (h) outputting data representing eligibility for withdrawal of said tangible annuity contract value and data representing said tangible amounts available for withdrawal or remaining from the living contingent and supporting annuity contract component funding values at specified times across the life period of the potential or existing annuity contract.

* * * * *